(12) United States Patent
Matsubara et al.

(10) Patent No.: US 9,544,244 B2
(45) Date of Patent: Jan. 10, 2017

(54) RESOURCE SEARCHING DEVICE AND COMPUTER READABLE RECORDING MEDIUM STORING RESOURCE SEARCHING PROGRAM

(71) Applicant: FUJITSU LIMITED, Kawasaki-shi, Kanagawa (JP)

(72) Inventors: Masazumi Matsubara, Yamato (JP); Yukihiro Watanabe, Kawasaki (JP); Toshihiro Kodaka, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 338 days.

(21) Appl. No.: 14/307,534

(22) Filed: Jun. 18, 2014

(65) Prior Publication Data

US 2014/0297874 A1 Oct. 2, 2014

Related U.S. Application Data

(63) Continuation of application No. PCT/JP2011/079366, filed on Dec. 19, 2011.

(51) Int. Cl.
*G06F 15/173* (2006.01)
*H04L 12/911* (2013.01)
*G06F 17/30* (2006.01)
*G06F 9/50* (2006.01)
(Continued)

(52) U.S. Cl.
CPC .............. *H04L 47/70* (2013.01); *G06F 8/61* (2013.01); *G06F 9/5072* (2013.01); *G06F 17/30386* (2013.01); *H04L 67/16* (2013.01)

(58) Field of Classification Search
USPC ........... 705/35; 709/220, 221, 226; 718/104; 455/450
See application file for complete search history.

(56) References Cited

U.S. PATENT DOCUMENTS 8,019,870 B1 * 9/2011 Eppstein ............. H04L 41/5051
  709/220
8,032,634 B1 * 10/2011 Eppstein ................. H04L 67/34
  709/226
8,234,650 B1 * 7/2012 Eppstein ............... G06F 9/5072
  709/221
8,996,019 B2 * 3/2015 Eriksson ...................... 455/450
(Continued)

FOREIGN PATENT DOCUMENTS

JP 2007-094834 4/2007
JP 2007-133654 5/2007
JP 2007-200128 8/2007
(Continued)

OTHER PUBLICATIONS

International Search Report, mailed in connection with PCT/JP2011/079366 and mailed Feb. 14, 2012, 2 pages.
(Continued)

*Primary Examiner* — Quang N Nguyen
(74) *Attorney, Agent, or Firm* — Fujitsu Patent Center

(57) ABSTRACT

A resource searching device includes a requirement acquisition unit configured to acquire resource requirement information including resource requirements for a plurality of resources, the resources being related to a deployment request of a plurality of received resources and being related to devices or connections between the devices; a calculation unit configured to refer to system configuration information including information on the resources related to devices and connections between the devices in an information processing system to be managed, and to calculate fulfillment rate information including a fulfillment rate for each of the resources that satisfy the resource requirements; and a searching unit configured to search for a plurality of resources corresponding to the deployment request of the plurality of resources by sequentially selecting the resources that satisfy the resource requirements on the basis of the fulfillment rate information and the connections between the devices in the deployment request.

12 Claims, 18 Drawing Sheets

(51) Int. Cl.
*H04L 29/08* (2006.01)
*G06F 9/445* (2006.01)

(56) References Cited

U.S. PATENT DOCUMENTS

| | | | |
|---|---|---|---|
| 2007/0106798 A1 | 5/2007 | Masumitsu et al. | |
| 2007/0220509 A1 | 9/2007 | Shwartz et al. | |
| 2010/0106634 A1* | 4/2010 | Atureliya | G06Q 10/06 705/35 |
| 2011/0286328 A1 | 11/2011 | Sugauchi et al. | |
| 2012/0179823 A1 | 7/2012 | Hatasaki et al. | |
| 2012/0240125 A1* | 9/2012 | Danko | G06F 9/50 718/104 |

FOREIGN PATENT DOCUMENTS

| | | |
|---|---|---|
| JP | 2011-081827 | 4/2011 |
| JP | 2011-243112 A | 12/2011 |
| WO | 2008/007435 | 1/2008 |
| WO | 2011/070803 | 6/2011 |

OTHER PUBLICATIONS

Luigi P. Cordella et al., "A (sub)Graph Isomorphism Algorithm for Matching Large Graphs", IEEE Transactions on Pattern Analysis and Machine Intelligence, vol. 26, No. 10. (Oct. 2004) pp. 1367-1372.

Roberto Battiti et al., "An Algorithm Portfolio for the Sub-graph Isomorphism Problem", Lecture Notes in Computer Science, Engineering Stochastic Local Search Algorithms. Designing, Implementing and Analyzing Effective Heuristics, vol. 4638/2007, pp. 106-120 (Aug. 22, 2007).

Yin-Tang Dai et al., "A Fast Labeled Graph Matching Algorithm Based on Edge Matching and Guided by Search Route", Proceedings of the 2009 International Conference on Wavelet Analysis and Pattern Recognition, Baoding, (Jul. 12-15, 2009), pp. 1-7.

Extended European Search Report dated Oct. 6, 2015 for corresponding European Patent Application No. 11877957.8, 7 pages.

Ando, S. et al.,"Evaluation of Scheduling Algorithms for Advance Reservations", Report of Search of Information Processing Society of Japan, Information Processing Society of Japan, Dec. 7, 2007, vol. 2007, No. 122, pp. 37-42, with English Abstract included in the literature.

Japanese Office Action mailed Oct. 13, 2015 for corresponding Japanese Patent Application No. 2013-549974, with Partial English Translation, 6 pages.

Notification of Transmittal of Translation of the International Preliminary Report on Patentability (Form PCT/IB/338, Form PCT/IB/373 & Form PCT/ISA/237), PCT/JP2011/079366, 6 pages, dated Jul. 3, 2014.

* cited by examiner

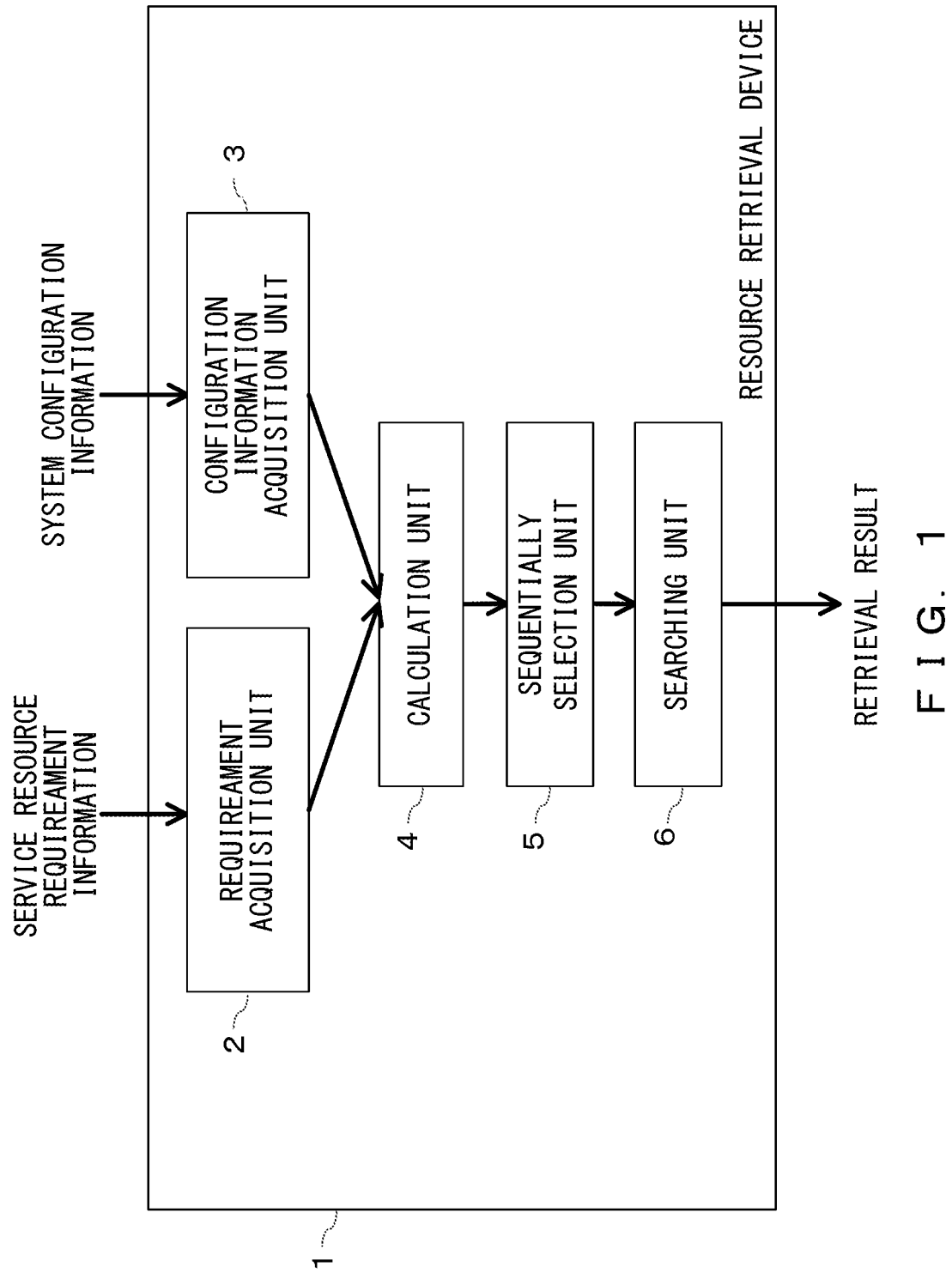
F I G. 1

```xml
<?xml version="1.0" encoding="UTF-8" standalone="yes"?>
<graph xmlns="urn:xmlns-fujitsu-com:s3po2011">

<templates>
    <template id="server-S" name="SMALL INSTANCE"
        type="server">
      <attributes>
        <attribute name="# of CPU cores" value="2"/>
        <attribute name="memory capacity" value="1740"/>
        <attribute name="storage capacity" value="160"/>
      </attributes>
    </template>
    ...
  </templates>

<topology>
    <node id="sv0" name="server0" template="server-S" />
    <node id="sv1" name="server1" template="server-L" />
    <node id="sv2" name="server2" template="server-L" />
    <node id="st1" name="storage1" type="storage">
      <attributes>
        <attribute name="storage capacity" value="4000"/>
      </attributes>
    </node>
    ...
    <edge id="sv0-sv2" name="sv0-sv2" source="sv0"
        target="sv2">
      <attributes>
        <attribute name="network bandwidth" value="10"/>
      </attributes>
    </edge>
    ...
  </topology>

</graph>
```

- 31: templates block
- 32: topology block
- 33: storage node
- 34: edge

F I G. 4

```xml
<?xml version="1.0" encoding="UTF-8" standalone="yes"?>
<graph xmlns="urn:xmlns-fujitsu-com:s3po2011">

<templates>
    <template id="pg1" name="PRIMERGY XXX" type="server">
      <attributes>
        <attribute name="# of CPU cores" value="20"/>
        <attribute name="memory capacity" value="8192"/>
        <attribute name="storage capacity" value="600"/>
      </attributes>
    </template>

...

<template id="edgeTmpl3" name="40G EDGE" type="edge">
      <attributes>
        <attribute name="network bandwidth" value="40000"/>
      </attributes>
    </template>

</templates>                                                                  ⎫ 41

<topology>
    <node id="sv1_1" name="sv1_1" template="pg1">
      <attributes>
        <attribute name="# of CPU cores" value="16"/>
        <attribute name="memory capacity" value="6000"/>
        <attribute name="storage capacity" value="500"/>
      </attributes>
    </node>

<edge id="sw1-sw4" name="sw1-sw4" source="sw1" target="sw4" template="edgeTmpl2"/>
    <edge id="sw2-sw4" name="sw2-sw4" source="sw2" target="sw4" template="edgeTmpl2"/>
    <edge id="sw3-sw4" name="sw3-sw4" source="sw3" target="sw4" template="edgeTmpl2"/>
    ...

</topology>
</graph>
```

| NODE | REQUIREMENT |
|------|-------------|
| FW | CPU PERFORMANCE: 1.0<br>MEMORY CAPACITY: 2 GB<br>DISK CAPACITY: 40 GB |
| SLB | CPU PERFORMANCE: 1.0<br>MEMORY CAPACITY: 2 GB<br>DISK CAPACITY: 40 GB |
| AP1 | CPU PERFORMANCE: 2.5<br>MEMORY CAPACITY: 4 GB<br>DISK CAPACITY: 40 GB<br>LOCATION: KANSAI |
| AP2 | CPU PERFORMANCE: 2.5<br>MEMORY CAPACITY: 4 GB<br>DISK CAPACITY: 40 GB<br>LOCATION: KANSAI |
| DB | CPU PERFORMANCE: 4.0<br>MEMORY CAPACITY: 16 GB<br>DISK CAPACITY: 300 GB |

FIG. 7

| REGION | NODE | ALLOCATABLE RESOURCE |
|---|---|---|
| KANTO | e-sv1 | CPU PERFORMANCE: 8.0, MEMORY CAPACITY: 40 GB, DISK CAPACITY: 300 GB, ... |
| | e-sv2 | CPU PERFORMANCE: 6.5, MEMORY CAPACITY: 22 GB, DISK CAPACITY: 300 GB, ... |
| | e-sv3 | CPU PERFORMANCE: 5.0, MEMORY CAPACITY: 30 GB, DISK CAPACITY: 150 GB, ... |
| | e-st1 | DISK CAPACITY: 2 PB |
| | ... | (IT IS ASSUMED THAT TOTAL OF 500 SERVERS ARE ALREADY REGISTERED.) |
| CHUBU | m-sv1 | CPU PERFORMANCE: 3.0, MEMORY CAPACITY: 8 GB, DISK CAPACITY: 450 GB, ... |
| | m-sv2 | CPU PERFORMANCE: 3.0, MEMORY CAPACITY: 12 GB, DISK CAPACITY: 40 GB, ... |
| | ... | (IT IS ASSUMED THAT TOTAL OF 150 SERVERS ARE ALREADY REGISTERED.) |
| KANSAI | w-sv1 | CPU PERFORMANCE: 5.5, MEMORY CAPACITY: 20 GB, DISK CAPACITY: 300 GB, ... |
| | w-sv2 | CPU PERFORMANCE: 8.0, MEMORY CAPACITY: 35 GB, DISK CAPACITY: 40 GB, ... |
| | ... | (IT IS ASSUMED THAT TOTAL OF 350 SERVERS ARE ALREADY REGISTERED.) |

| REGION | NODE | ALLOCATABLE RESOURCE | |
|---|---|---|---|
| KANTO | e-sv1 | CPU PERFORMANCE: 8.0, MEMORY CAPACITY: 40 GB, DISK CAPACITY: 300 GB, ... | →AP2 × |
| | e-sv3 | CPU PERFORMANCE: 5.0, MEMORY CAPACITY: 30 GB, DISK CAPACITY: 150 GB, ... | →AP2, DB × |
| CHUBU | m-sv1 | CPU PERFORMANCE: 3.0, MEMORY CAPACITY: 8 GB, DISK CAPACITY: 450 GB, ... | →AP2, DB × |
| KANSAI | w-sv1 | CPU PERFORMANCE: 5.5, MEMORY CAPACITY: 20 GB, DISK CAPACITY: 300 GB, ... | →ALL ○ |

| NODE | ADAPTATION RATIO |
|---|---|
| FW | 0.50 |
| SLB | 0.50 |
| AP1 | 0.35 |
| AP2 | 0.20 |
| DB | 0.10 |

DETERMINE NODE WITH HIGHEST SCARCITY AS LEADING NODE

CANDIDATE OF LINEAR LIST FOR NODES FOR WHICH NODE WITH HIGHEST SCARCITY IS LEADING NODE

SEARCH SEQUENCE LIST (NODE-BASED LIST IS CHANGED TO EDGE-BASED ONE AND MADE INTO LIST.)

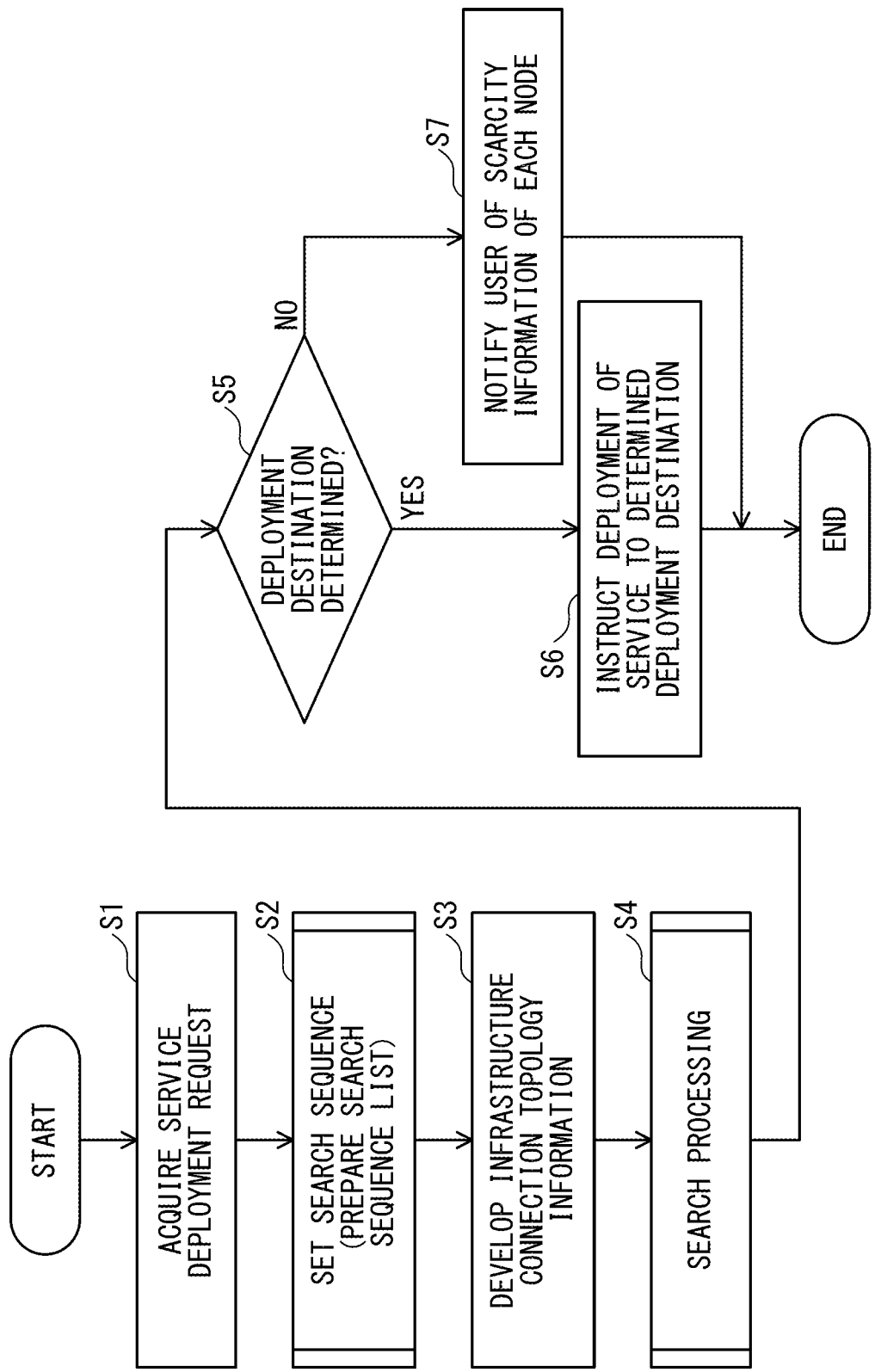
F I G. 12

| NODE | ADAPTATION RATIO | SCARCITY ORDER |
|---|---|---|
| FW | 0.50 | 4 |
| SLB | 0.50 | 4 |
| AP1 | 0.35 | 3 |
| AP2 | 0.20 | 2 |
| DB | 0.10 | 1 |

RESOURCE SEARCHING DEVICE AND COMPUTER READABLE RECORDING MEDIUM STORING RESOURCE SEARCHING PROGRAM

CROSS-REFERENCE TO RELATED APPLICATION

This application is a continuation application of International Application PCT/JP2011/079366 filed on Dec. 19, 2011 and designated the U.S., the entire contents of which are incorporated herein by reference.

FIELD

The present embodiment relates to a technology for searching a resource of an information processing system.

BACKGROUND

In a large-scale data center represented by the cloud, it is taken into consideration that which usable resource is to be allocated for a service deployment request from a user. Such resource allocation is taken into consideration both in the case of a single data center and in the case of a plurality of data centers.

Conventionally, resources have mainly been deployed by a virtual machine (VM: Virtual Machine) unit. That is, for a resource request of "needing a number X of VMs having a certain kind of performance and loaded with a certain kind of software", a server (group) that satisfies the request is searched and a resource is allocated.

However, in recent years, requests for resource deployment by a service unit are increasing. That is, not only (virtual) apparatuses such as a server and a storage configuring a service but also topology of a network connecting the apparatuses are taken into consideration to allocate a resource. As one of technologies of deployment by such a service unit, there is a system which allows resource selection satisfying restrictions for interacting operations for a request of a correlated resource group by a resource requester.

CITATION LIST

Patent Document 1: Japanese Patent Laid-Open No. 2007-094834
Patent Document 2: Japanese Patent Laid-Open No. 2011-81827
Non Patent Document 1: Luigi P. Cordella, Pasquale Foggia, C. S., Vento, M.: "A (sub)graph isomorphism algorithm for matching large graphs", IEEE Transactions on Pattern Analysis and Machine Intelligence 16(10) (October 2004) 1367-1372.
Non Patent Literature 2: Roberto Battiti, Franco Mascia, "An Algorithm Portfolio for the Sub-graph Isomorphism Problem", Lecture Notes in Computer Science, Engineering Stochastic Local Search Algorithms. Designing, Implementing and Analyzing Effective Heuristics, Volume 4638/2007 Pages 106-120, Aug. 22, 2007.
Non Patent Document 3: YIN-TANG DAI, SHI-YONG ZHANG, "A FAST LABELED GRAPH MATCHING ALGORITHM BASED ON EDGE MATCHING AND GUIDED BY SEARCH ROUTE", Proceedings of the 2009 International Conference on Wavelet Analysis and Pattern Recognition, Baoding, 12-15 Jul. 2009.

SUMMARY

A resource searching device includes a requirement acquisition unit configured to acquire resource requirement information including resource requirements for a plurality of resources, the plurality of resources being related to a deployment request of a plurality of received resources and being related to devices or connections between the devices; a calculation unit configured to refer to system configuration information including information on the plurality of resources related to devices and connections between the devices in an information processing system to be managed, and to calculate fulfillment rate information including a fulfillment rate for each of the plurality of resources that satisfy the resource requirements; and a searching unit configured to search for a plurality of searched resources corresponding to the deployment request of the plurality of resources by sequentially selecting the searched resources that satisfy the resource requirements on the basis of the fulfillment rate information and the connections between the devices in the deployment request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates one example of a resource management device in the present embodiment.

FIG. 4 illustrates a description example of service configuration information included in a resource deployment request sent from a terminal in the present embodiment.

FIG. 5 illustrates a description example of infrastructure configuration information for a usable resource of a management object ICT resource (infrastructure side) that is managed by a configuration management DB in the present embodiment.

FIG. 7 illustrates a resource requirement example imparted to each node in FIG. 6.

FIG. 8 illustrates an infrastructure configuration information example of an allocatable resource in the present embodiment.

FIG. 9 is a diagram for describing whether an allocatable resource of a node configuring an infrastructure in the present embodiment matches a resource requirement of the node configuring service connection topology information.

FIG. 12 illustrates one example of a resource search processing flow in the present embodiment.

FIG. 15 illustrates one example of a scarcity table holding scarcity of each node in the present embodiment (modification).

DESCRIPTION OF EMBODIMENTS

Figure 2:
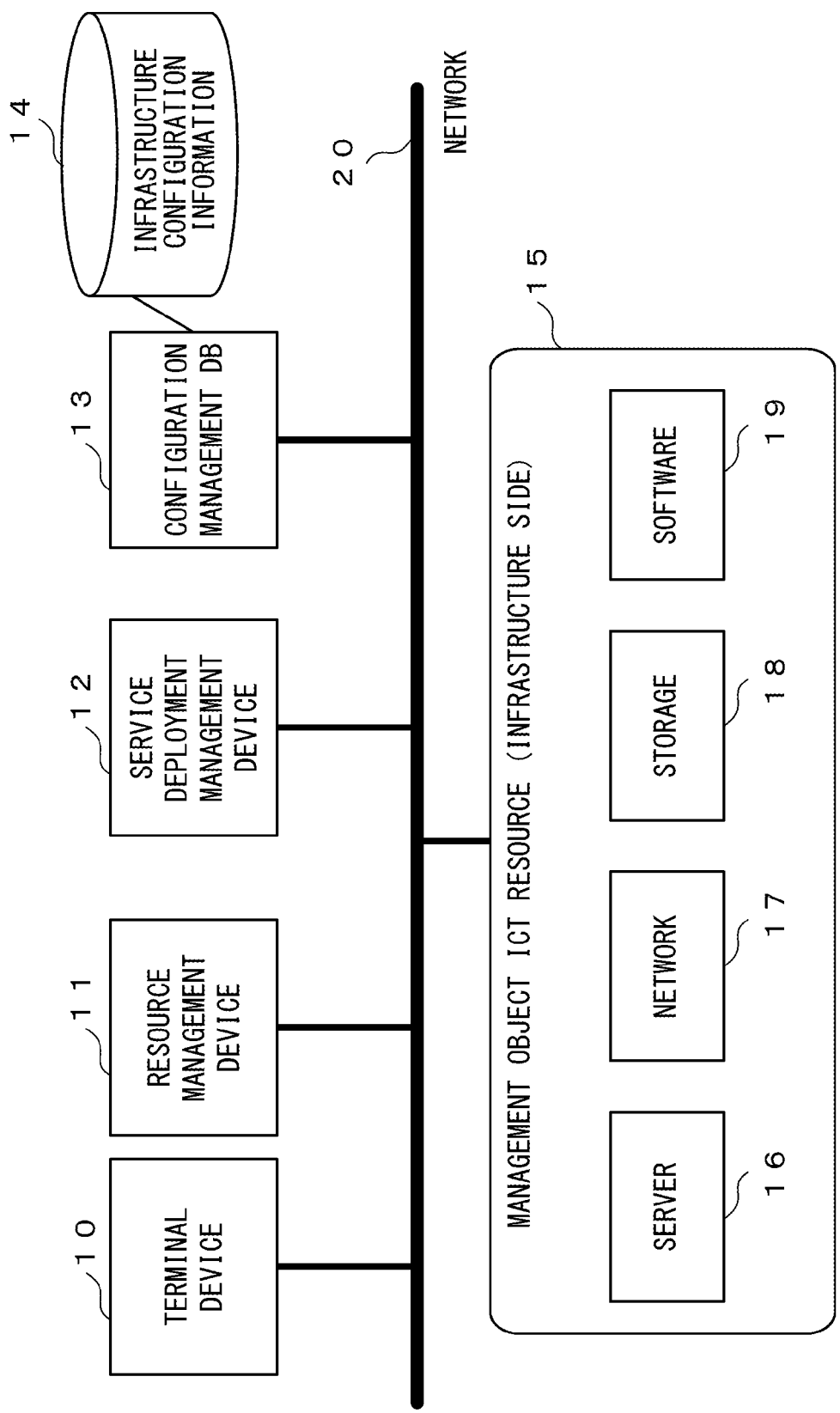
FIG. 2 illustrates the whole system configuration example in the present embodiment.

However, the above-described technology is a system that searches the resource group satisfying requirements including correlation in a wide range for requests of the resource group, and there is the risk that a search takes time.

In one aspect, the present invention provides a resource searching technology that efficiently searches a service having a resource satisfying a requirement requested by a user from an information processing system.

One of the technologies for carrying out resource deployment in consideration of topology of a network connecting apparatuses is a graph matching technology (graph isomorphism problem). In the graph matching technology, each apparatus is likened to a node, a network connecting the apparatuses is likened to an edge, and a resource on a data center side and a resource of a service requested by a user are expressed as graphs respectively and matched. At the time, whether or not a usable resource on the data center side satisfies a request on a service side is checked. Thus, the resource deployment satisfying requirements as the entire service is made possible.

There exist various graph matching algorithms. An edge-based graph matching algorithm among them is excellent in memory saving and rapidity compared to the other algorithms. In the edge-based graph matching algorithm, a system configuration of the service requested by the user is developed and a linear list in which the edges are connected is prepared. The resource of the service requested by the user is matched with the usable resource on the data center side sequentially from a leading edge in the linear list. By applying the graph matching algorithm, high-speed resource deployment is achieved to some extent while surely satisfying service requirements.

Also, in the graph matching algorithm, a node/edge selection sequence when preparing the linear list is not taken into consideration deeply. For instance, the linear list is prepared with priority given to a width or a depth from an arbitrary node. When using this method, track of returning to the node one or more before in the linear list and repeating matching processing when a matching node is not found, occurs highly frequently and a search takes time.

In one aspect of the present embodiment, as illustrated in FIG. 1, a resource searching device that efficiently searches a service having a resource satisfying requirements requested by a user from an information processing system is provided.

FIG. 1 illustrates one example of a resource management device in the present embodiment. A resource management device 1 includes a requirement acquisition unit 2, a configuration information acquisition unit 3, a calculation unit 4, a sequentially selection unit 5, and a searching unit 6.

The requirement acquisition unit 2 acquires service resource requirement information including a resource requirements related to the resource of the service. The service is defined by information including resources related to devices and resources related to connections between the devices as elements. As one example of the requirement acquisition unit 2, there is a request acquisition unit 21.

The configuration information acquisition unit 3 acquires system configuration information which is configuration information of the information processing system. The system configuration information is defined by the information including the resources related to the devices and the resources related to the connections between the devices as the elements, in the information processing system in which a plurality of the devices are connected. As one example of the configuration information acquisition unit 3, there are a scarcity calculation unit 23 and a resource management unit 24.

The calculation unit 4 calculates a fulfillment rate of the element satisfying the resource requirements for the elements acquired from the system configuration information. As one example of the calculation unit 4, there is the scarcity calculation unit 23.

The sequentially selection unit 5 initially selects the element with the lowest fulfillment rate. The sequentially selection unit 5 sequentially selects the element which is not selected following the connections from the initially selected element in service connection topology information. The service connection topology information is information indicating connection topology of the service expressed by connection relation between the devices forming the service. Here, in the case where a plurality of the unselected elements are connected to the element selected last when sequentially selecting the unselected elements following the connections from the initially selected element, the sequentially selection unit 5 may select the element with the lowest fulfillment rate among the unselected elements. As one example of the sequentially selection unit 5, there is a sequence setting unit 22.

The searching unit 6 searches the element of the service satisfying the resource requirements in the selection sequence of the elements from system connection topology information. The system connection topology information is information indicating connection topology of the information processing system expressed by the connection relation between the devices included in the configuration information. As one example of the searching unit 6, there is an allocation determination unit 25.

More specifically, the calculation unit 4 calculates the fulfillment rate of the device satisfying the resource requirements for the devices acquired from the system configuration information. The sequentially selection unit 5 initially selects the device with the lowest fulfillment rate, sequentially selects the device which is not selected following the connections from the initially selected device in the service connection topology information, and sequentially arranges the connections such that the devices appear in the sequence of selection. The searching unit 6 searches the device and the connection configuring the service connection topology satisfying the resource requirements in the arrangement sequence of the connections from the system connection topology information. Here, in the case where the plurality of unselected devices are connected to the device selected last when sequentially selecting the unselected devices following the connections from the initially selected device, the sequentially selection unit 5 may execute the following processing. That is, the sequentially selection unit 5 may select the device with the lowest fulfillment rate among the unselected devices, and sequentially arrange the connections such that the devices appear in the sequence of the selection.

By a configuration like this, the service having the resource satisfying requirements requested by a user can be efficiently searched from the information processing system.

Hereinbelow, details of the present embodiment will be described.

FIG. 2 illustrates the whole system configuration example in the present embodiment. The system includes a terminal device 10, a resource management device 11, a service deployment management device 12, a configuration management database (DB) 13, a management object ICT (Information and Communication Technology) resource 15, and a network 20. The terminal device 10, the resource management device 11, the service deployment management device 12, the configuration management DB 13, and the management object ICT resource 15 are connected by the network 20.

The management object ICT resource 15 is an ICT resource of an infrastructure including a server 16, a network 17, a storage 18 and software 19, etc. In the following, the management object ICT resource 15 is also called the infrastructure. Each apparatus configuring the management object ICT resource is called a "node". A network connecting the individual apparatuses (nodes) is called an "edge". Here, the server 16 includes various servers such as an application server (AP), a DB server and a WEB server. The network 17 includes a network environment such as a network apparatus and a communication band width of the network.

The terminal device (called a "terminal", hereinafter) 10 is a computer operated by a user. The terminal 10 outputs request information (service deployment request) for searching the resource satisfying the requirement (resource requirement) related to the resource requested by the user from the management object ICT resource 15 by an operation by the user. Here, the resource (a combination of the server 16, the network 17, the storage 18 and the software 19, etc.,) satisfying the resource requirement requested by the user is called a service.

The configuration management DB 13 is a database including infrastructure configuration information 14 for a configuration of the management object ICT resource 15 (infrastructure).

Upon receiving the service deployment request transmitted from the terminal device 10, the resource management device 11 searches the resource satisfying the resource requirement set by the user in the management object ICT resource 15 by using the configuration management DB 13, and determines a deployment destination of the resource. The resource management device 11 transmits deployment instruction information to the service deployment management device 12 so as to deploy (allocate) the resource to the determined deployment destination of the resource.

Upon receiving the deployment instruction information from the resource management device 11, the service deployment management device 12 allocates the resource requested by the user to the management object ICT resource 15 on the basis of the deployment instruction information.

Both of the resource management device 11 and the service deployment management device 12 are capable of controlling the management object ICT resource 15 through the network 20.

Figure 3:
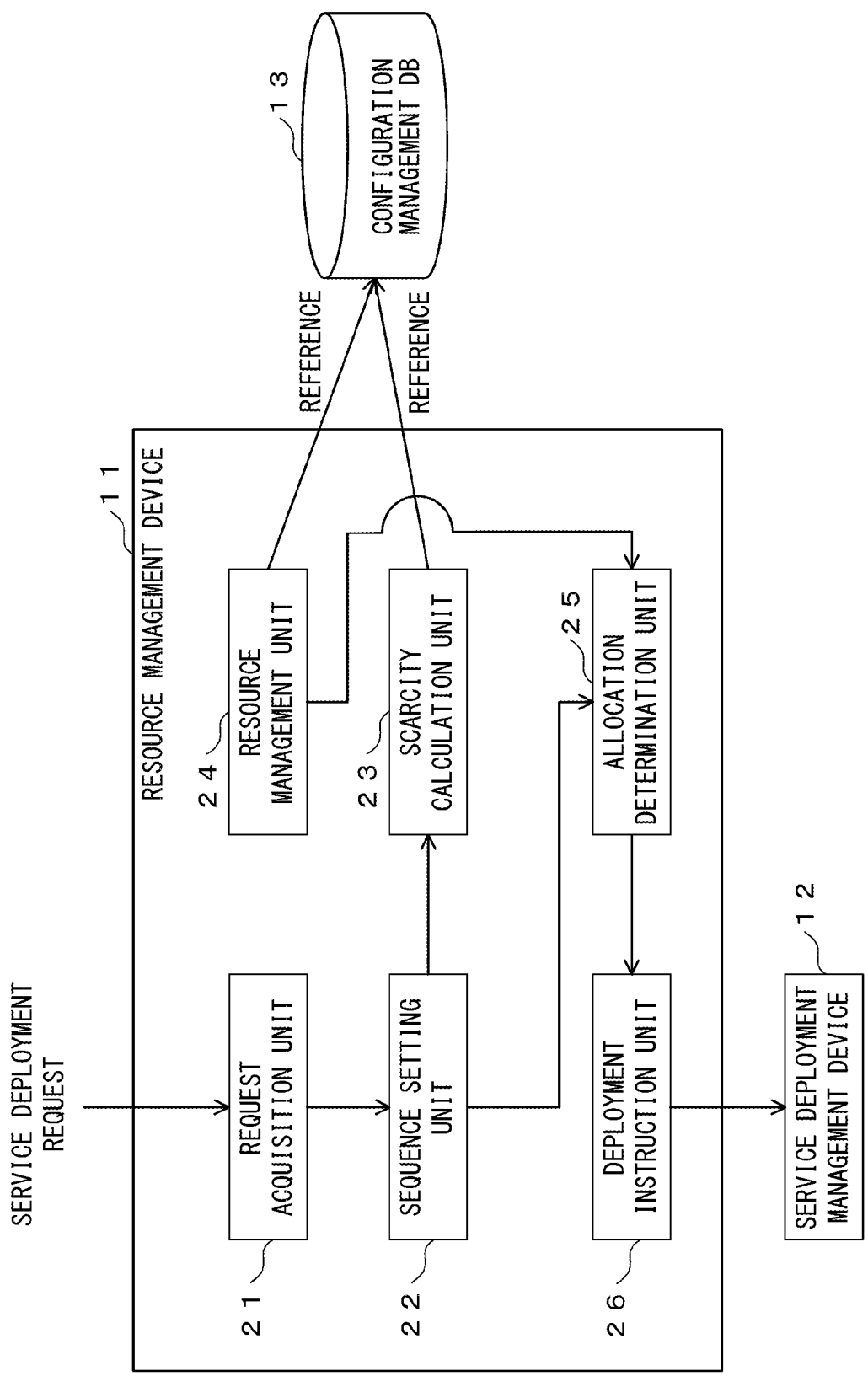
FIG. 3 illustrates one practical example of a configuration of the resource management device in the present embodiment.

FIG. 3 illustrates one practical example of a configuration of the resource management device in the present embodiment. The resource management device 11 includes the request acquisition unit 21, the sequence setting unit 22, the scarcity calculation unit 23, the resource management unit 24, the allocation determination unit 25, and a deployment instruction unit 26.

The request acquisition unit 21 acquires the service deployment request transmitted from the terminal device 10.

The scarcity calculation unit 23 acquires usable infrastructure configuration information 14 from the configuration management DB 13. The scarcity calculation unit 23 uses the usable infrastructure configuration information 14 and a resource request included in the service deployment request to calculate scarcity of each node configuring the service satisfying the request of the user.

The scarcity of the node is smallness of the fulfillment rate of the node satisfying the resource requirement requested by the user among the nodes included in the management object ICT resource (resource on an infrastructure side) 15. Here, an index for indicating the scarcity will be described. As the index for indicating the scarcity, the following can be adopted, for instance.

(First index) The number (ratio) of suitable nodes in the entire system: The scarcity calculation unit 23 calculates the number of the nodes satisfying the resource requirement requested by the user from all the nodes included in the management object ICT resource 15 for each node configuring the service. The scarcity calculation unit 23 can define one whose calculated value (or ratio) is small as highly scarce.

(Second index) An approximate value for the number of suitable nodes by random extraction: The scarcity calculation unit 23 randomly extracts a certain number of the nodes from the management object ICT resource 15. Then, the scarcity calculation unit 23 calculates how many nodes satisfy the resource requirement among the extracted nodes for each node configuring the service. The scarcity calculation unit 23 can define one whose calculated value (or ratio) is small as highly scarce.

(Third index): Calculation based on entropy: The scarcity calculation unit 23 calculates a dispersion degree (entropy) of the nodes satisfying the resource requirement from the management object ICT resource 15 for each node configuring the service. The scarcity calculation unit 23 can define that the smaller the calculated entropy is, the higher the scarcity is.

In this way, the scarcity calculation unit 23 can calculate the scarcity of each element (node) of the ICT resource configuring the service requested from the user.

The sequence setting unit 22 sets a search sequence to be used when carrying out the search in the allocation determination unit 25 on the basis of the calculated scarcity. Specifically, the sequence setting unit 22 develops information (service connection topology information) indicating the connection topology of the service expressed by relation between the nodes and the edges, from the service deployment request. The sequence setting unit 22 sequentially selects the nodes within the service connection topology information by using the calculated scarcity, arranges the edges such that the nodes appear in the sequence of the selection, and registers the edges in the sequence of the arrangement in a search sequence list. At this time, the sequence setting unit 22 initially selects the node determined as being the scarcest. For a selection sequence of the following nodes, the sequence setting unit 22 may arbitrarily set it or may set it sequentially on the basis of the magnitude of the scarcity.

The resource management unit 24 acquires the infrastructure configuration information 14 of the management object ICT resource 15 from the configuration management DB 13. The resource management unit 24 uses the acquired infrastructure configuration information 14 to prepare information (infrastructure connection topology information) indicating the connection topology of the infrastructure expressed by the relation between the nodes and the edges.

The allocation determination unit 25 searches the service connection topology information from the infrastructure connection topology information by collating the infrastructure connection topology information and the elements of the service connection topology information in the search sequence set in S2. When the service connection topology information is searched, the allocation determination unit 25 determines the searched service connection topology information as the deployment destination (allocation destination) of the resource. That is, the allocation determination unit 25 collates whether or not the edge on the infrastructure side satisfies the resource requirement and whether the nodes at both ends of the edge satisfying the resource requirement satisfy the resource requirements of the nodes at both ends of the edge registered in the search sequence list, in a registration sequence of the edges to the search sequence list. Thus, the allocation determination unit 25 detects the node and edge deployment destination configuring the service from the collated infrastructure side.

The deployment instruction unit 26 instructs the deployment of the service requested by the user at the determined deployment destination of the resource, to the service deployment management device 12.

FIG. 4 illustrates a description example of service configuration information included in the resource deployment request sent from the terminal in the present embodiment. FIG. 4 illustrates the description example of the service configuration information using an XML (eXtensible Markup Language) format. In the description example of the service configuration information, a structure of an object service is stipulated by the nodes and the edges. Requirements of the nodes and the edges are expressed by respectively imparted attributes.

The description example in FIG. 4 includes a template 31 that appears under/graph/templates, and request resource information 32 that appears under/graph/topology. In anode definition 33 and an edge definition 34 within the request resource information 32, the requirements of the nodes and the edges included in the service are described. The node definition 33 and the edge definition 34 each includes the attributes such as an id, a name, a type, and a template. Here, the template is a template of an object node/edge, and means takeover of the type and the attribute described in a template definition (under/graph/templates/template element) having an ID indicated by the template attribute. Also, the attribute is the requirement (condition) requested to the deployment destination resource as the object node/edge.

FIG. 5 illustrates a description example of the infrastructure configuration information for the usable resource of the management object ICT resource (infrastructure side) managed by the configuration management DB in the present embodiment. FIG. 5 illustrates the description example of the infrastructure configuration information of the resource using the XML (eXtensible Markup Language) format. The description example in FIG. 5 includes a template 41 that appears under/graph/templates, and usable resource information 42 that appears under/graph/topology.

A data structure in FIG. 5 is similar to the data structure described in the description example of the service configuration information in FIG. 4. However, the meaning of the attribute is different. While the attribute indicates the resource requirement to be requested in the description example of the service connection topology information in FIG. 4, the attribute indicates the resource requirement of the usable resource in FIG. 5.

Next, contents of the present embodiment will be described using FIG. 6 to FIGS. 11A-11C.

Figure 6:
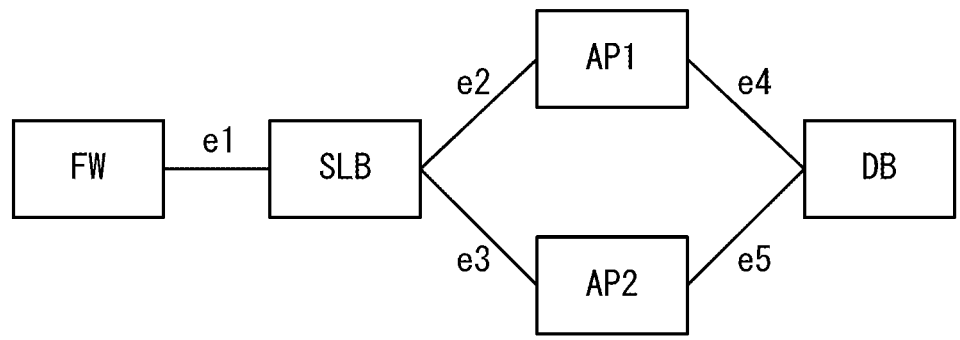
FIG. 6 illustrates one example of service connection topology information requested by a user in the present embodiment.

FIG. 6 illustrates one example of the service connection topology information requested by the user in the present embodiment. The service connection topology information is the service configuration information in FIG. 4 that is developed on a memory. In FIG. 6, for convenience of descriptions, the service connection topology information is illustrated. Components (nodes) of the service connection topology information illustrated in FIG. 6 include a firewall device (FW), a server loadbalancer device (SLB), an application server 1 (AP1), an application server 2 (AP2), and a database (DB). Also, the edges of the service connection topology information include edges e1 to e5.

The edge e1 is a network connecting the node FW and the node SLB. The edge e2 is a network connecting the nodes SLB and AP1. The edge e3 is a network connecting the node SLB and the node AP2. The edge e4 is a network connecting the node AP1 and the node DB. The edge e5 is a network connecting AP2 and DB.

FIG. 7 illustrates a resource requirement example imparted to each node in FIG. 6. The resource requirement is actually given by the description in FIG. 4, however, in FIG. 7, for the convenience of the descriptions, an attribute part of the node definition 33 of the request resource information 32 in FIG. 4 is extracted and indicated in a table.

For instance, the resource request of the node FW is a CPU performance: 1.0, a memory capacity: 2 gigabytes (GB), and a disk capacity: 40 gigabytes (GB). For instance, the resource request of the node AP2 is the CPU performance: 2.5, the memory capacity: 4 gigabytes (GB), the disk capacity: 40 gigabytes (GB), and a region (installation location): Kansai.

FIG. 8 illustrates an infrastructure configuration information example of an allocatable resource in the present embodiment. The infrastructure configuration information 14 of the allocatable resource is actually given by the description in FIG. 5, however, in FIG. 8, for the convenience of the descriptions, an attribute part of the node definition of the usable resource information 42 in FIG. 5 is extracted and indicated in a table. An item "region" in the table in FIG. 8 indicates an installation location of the node. An item "allocatable resource" in the table in FIG. 8 indicates the resource (the CPU performance, the memory capacity, and the disk capacity) allocatable to the node.

FIG. 9 is a diagram for describing whether the allocatable resource of the node configuring the infrastructure in the present embodiment matches the resource requirement of the node configuring the service connection topology information. In FIG. 9, descriptions are given paying attention to nodes e-sv1, e-sv3, m-sv1 and w-sv1 in the configuration information of the allocatable resource included in FIG. 8.

When comparing the nodes e-sv1, e-sv3 and m-sv1 (FIG. 8) with the nodes on the service connection topology information (FIG. 7), the nodes e-sv1, e-sv3 and m-sv1 (region: Kanto) do not satisfy the requirement (location: Kansai) of the node AP2 on the service connection topology information for region information. Also, when comparing the nodes e-sv1, e-sv3 and m-sv1 (FIG. 8) with the nodes on the service connection topology information (FIG. 7), the nodes e-sv3 and m-sv1 do not satisfy the requirement (CPU performance: 4.0, disk capacity: 300 GB) of the node DB within the service connection topology information. The other nodes FW, SLB, and AP1, the e-sv1, e-sv3, m-sv1 and w-sv1 listed here satisfy the resource requirements. As a result of determining all the nodes in this way, for instance, of all the 1,000 nodes, it is assumed that the following numbers of the respective nodes on the service connection topology information satisfy the requirements.

FW: 500, LB: 500, AP1: 350, AP2: 200, DB: 100

The case of checking all the nodes is indicated here, however, a certain number of samples may be randomly extracted (random sampling) and an approximate value of the number satisfying the requirements of each node may be used. As one example, the number of samples calculated by the following equation (1) may be randomly sampled.

$$n = N / \{(E/Z)^2 \{(N-1)/P(1-P)\} + 1\} \quad (1)$$

(n: the required number of samples, N: the size of a population, E: the maximum error, Z: a normal distribution point corresponding to a confidence rate, P: a predicted population rate (0.5, when prediction is difficult)

According to the equation (1), in the case of a confidence level 95%, the number of samples may be about 400 at most even for one million nodes.

Figure 10:
FIG. 10 illustrates one example of a scarcity table holding scarcity of each node in the present embodiment.

FIG. 10 illustrates one example of a scarcity table holding the scarcity of each node in the present embodiment. Here, as described as the first index, for each node within the service connection topology information, the ratio (adaptation probability) of the number of the nodes satisfying the resource requirements in the number of all the nodes is used as the index indicating the scarcity. From a scarcity table 50, it is recognized that the node DB with the lowest adaptation probability is the scarcest. The scarcity table 50 is stored in a memory provided in the resource management device 11.

When there are a plurality of nodes with the lowest adaptation probability, one of the nodes may be selected, or one of the nodes may be selected according to the lowness of the adaptation probability of the next nodes following the nodes.

Figure 11A:
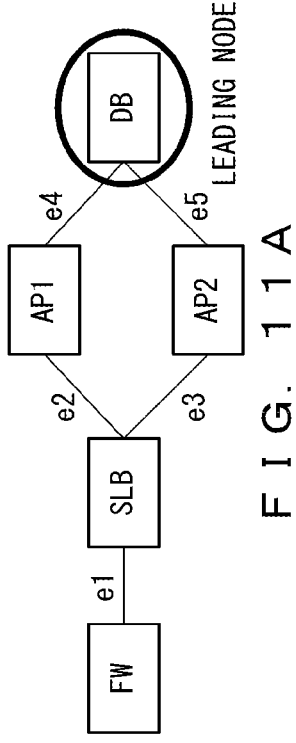
FIGS. 11A-11C are diagrams describing a preparation procedure of a search sequence list in the present embodiment.
Figure 11B:
Figure 11C:

FIGS. 11A-11C are diagrams for describing a preparation procedure of the search sequence list in the present embodiment. As illustrated in FIG. 11A, among the nodes configuring the service connection topology information in FIG. 6, the node DB with the highest scarcity calculated in FIG. 10 is determined as a leading node.

Next, the following node is selected following the edges from the determined leading node. When there are a plurality of unselected nodes that can be selected as the next node, an arbitrary node is selected. When there is no unselected node following the selected node, an unselected node is selected by going back to the node one before.

As the following node is selected following the edges from the determined leading node in this way, among linear lists indicated by the arrangement of the nodes from a root node to an end node of a node tree illustrated in FIG. 11B, one linear list is generated. Here, for instance, it is assumed that the linear list indicated by DB→AP2→SLB→FW→AP1 is generated. Since a graph matching algorithm used in the present embodiment uses an edge-based linear list, the node-based linear list generated above is changed to an edge base. Then, the linear list (search sequence list 60) illustrated in FIG. 11C: e5→e3→e1→e2→e4 is obtained.

FIG. 12 illustrates one example of a resource search processing flow in the present embodiment. The request acquisition unit 21 acquires the service deployment request from the terminal 10 (S1).

The sequence setting unit 22 sets the search sequence described below. Specifically, the sequence setting unit 22 reads the nodes configuring the service and the edges connecting the nodes from the acquired service deployment request. Then, the sequence setting unit 22 develops the information (service connection topology information) indicating the connection topology of the service expressed by the relation between the nodes and the edges on the memory. The sequence setting unit 22 uses the scarcity calculation unit 23 to generate the search sequence list 60 in which the edges included in the service connection topology information are set in a prescribed sequence (S2). S2 will be described in detail in FIG. 13.

The resource management unit 24 acquires the infrastructure configuration information 14 of the management object ICT resource 15 from the configuration management DB 13. The resource management unit 24 reads the nodes configuring the infrastructure and the edges connecting the nodes from the acquired infrastructure configuration information 14. Then, the resource management unit 24 develops the information (infrastructure connection topology information) indicating the connection topology of the infrastructure expressed by the relation between the nodes and the edges on the memory (S3).

The allocation determination unit 25 searches the service connection topology information from the infrastructure connection topology information by collating the infrastructure connection topology information and the elements of the service connection topology information in the search sequence set in S2. When the service connection topology information is searched, the allocation determination unit 25 determines the searched service connection topology information as the deployment destination (allocation destination) of the resource (S4). S4 will be described in detail in FIG. 14.

When the deployment destination of the resource is determined ("YES" in S5), the deployment instruction unit 26 instructs the deployment of the service requested by the user at the determined deployment destination of the resource, to the service deployment management device 12 (S6). The service deployment management device 12 deploys the service to the deployment destination on the basis of the service deployment instruction.

When the deployment destination is not determined in S4 ("NO" in S5), the allocation determination unit 25 notifies the terminal 10 of scarcity information (FIG. 10) of each node included in the service connection topology information (S7). Also, when the deployment destination is not determined, by looking over the notified scarcity information, the user can take measures of moderating limitation of each node and issuing a deployment request again or the like.

Figure 13:
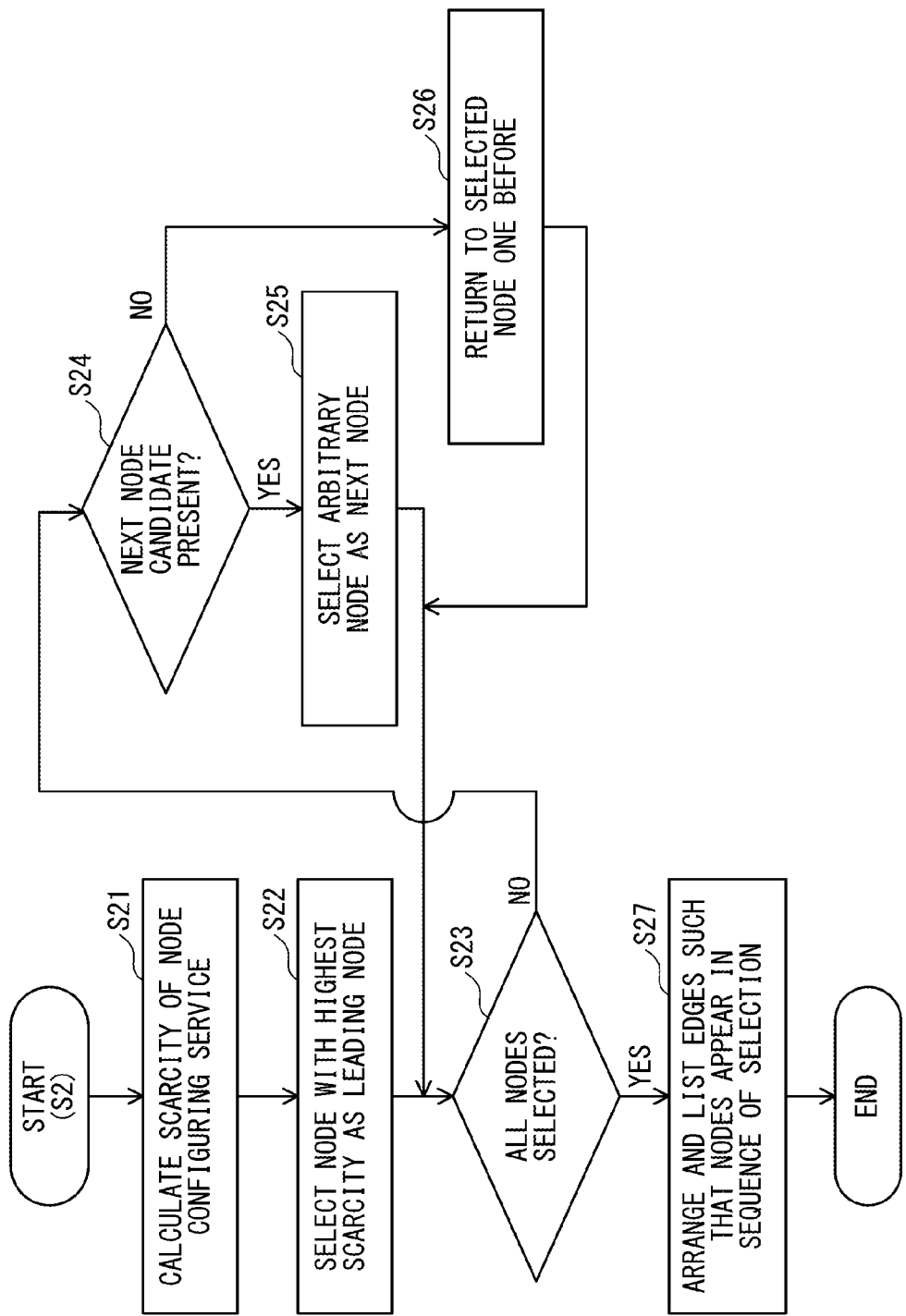
FIG. 13 illustrates one example of a detailed flow of search sequence setting processing (S2).

FIG. 13 illustrates one example of a detailed flow of search sequence setting processing (S2). The scarcity calculation unit 23 calculates the scarcity for each node configuring the service connection topology information as described using FIG. 6 to FIG. 10 (S21). The scarcity calculation unit 23 stores the calculated scarcity of each node in the scarcity table 50.

As described in FIGS. 11A-11C, the sequence setting unit 22 selects the node with the highest scarcity from the values of the calculated scarcity (S22). The sequence setting unit 22 stores the selected node in the memory as the leading node.

Next, the sequence setting unit 22 determines whether or not the selection of all the nodes included in the service connection topology information is completed (S23).

When there is the unselected node ("NO" in S23), the sequence setting unit 22 determines whether or not there is a next node candidate (the node which is connected with the node selected last by the edge and is not selected) (S24). When there are one or more next node candidates ("YES" in S24), the sequence setting unit 22 selects an arbitrary node as the next node and stores the selected node in the memory (S25). Thereafter, processing returns to S23.

When there is no next node candidate, the sequence setting unit 22 returns further to the selected node one before (S26), and carries out the processing of S24.

Also, the nodes are sequentially selected in S22 and S25, and the selected nodes are stored on the memory in the selection sequence from the leading node.

When the selection of all the nodes is completed, the sequence setting unit 22 prepares the linear list (search sequence list 60) for the edges connecting the nodes from the selection sequence of the selected nodes (S27). The search sequence list 60 is prepared by arranging the edges such that the nodes appear in the sequence of the selection, as described in FIG. 11C.

Figure 14:
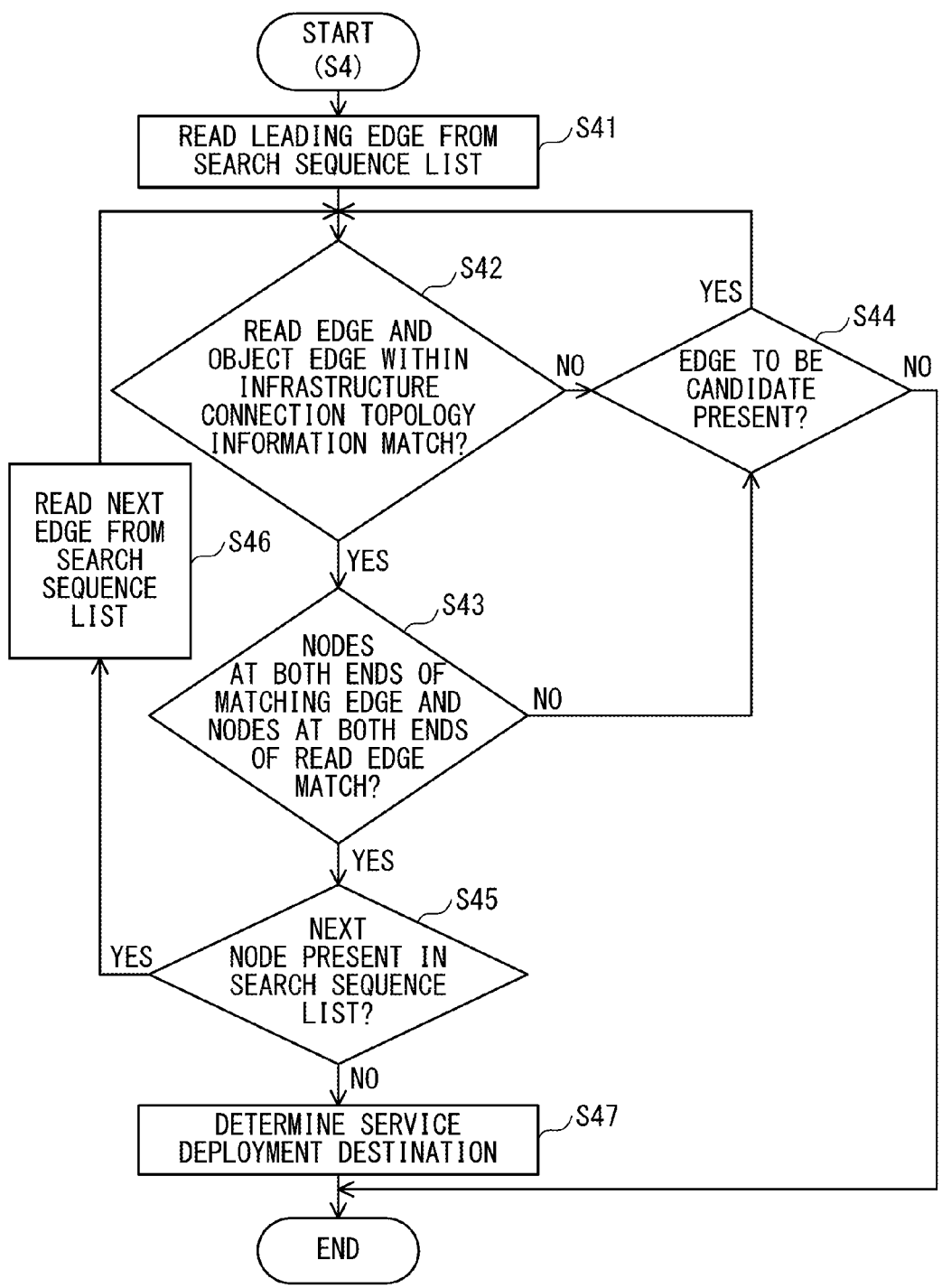
FIG. 14 illustrates one example of a detailed flow of search processing (S4).

FIG. 14 illustrates one example of a detailed flow of search processing (S4). The allocation determination unit 25 reads the leading edge from the search sequence list 60 prepared in S2 (S41).

The allocation determination unit 25 matches the read edge and the edge (object edge) within the infrastructure connection topology information (S42). Specifically, the allocation determination unit 25 acquires the resource requirement for the read edge from the service deployment request. The allocation determination unit 25 extracts the edge satisfying the resource requirement of the read edge from the infrastructure connection topology information.

In S42, when the read edge and the object edge do not match ("NO" in S42), the allocation determination unit 25 determines whether or not there is another edge to be a candidate within the infrastructure connection topology information. When there is another edge to be the candidate within the infrastructure connection topology information ("YES" in S44), the allocation determination unit 25 matches the edge to be the candidate and the read edge. When there is no edge to be the candidate in S44 ("NO" in S44), this flow is ended.

In S42, when the read edge and the object edge match ("YES" in S42), the allocation determination unit 25 carries out the next processing. That is, the allocation determination unit 25 matches the nodes at both ends of the matching object edge within the infrastructure connection topology information and the nodes within the service connection topology information at both ends of the read edge (S43). Specifically, the allocation determination unit 25 acquires the resource requirements of the nodes within the service connection topology information at both ends of the read edge from the service deployment request. The allocation determination unit 25 determines whether or not the object nodes at both ends of the object edge within the infrastructure connection topology information satisfy the resource requirements.

In S43, when the object nodes at both ends of the object edge within the infrastructure connection topology information do not satisfy the resource requirements ("NO" in S43), the allocation determination unit 25 carries out the processing of S44. In S43, when the object nodes at both ends of the object edge within the infrastructure connection topology information satisfy the resource requirements ("YES" in S43), the allocation determination unit 25 determines whether or not there is the next edge in the search sequence list 60 (S45).

When there is the next edge in the search sequence list 60 ("YES" in S45), the allocation determination unit 25 reads the edge from the search sequence list 60 (S46), and carries out the processing of S42. The processing of S42 to S45 is repeated until the processing of the edge at the end of the search sequence list 60 is completed.

When the processing of the edge at the end of the search sequence list 60 is completed ("NO" in S45), the allocation determination unit 25 determines the matching node as the deployment destination of the service (S47).

According to the present embodiment, when searching the service connection topology information from the infrastructure connection topology information, by carrying out the search from the highest scarcity of the service connection topology information, the possibility of track can be lowered. That is, efficient search is made possible by the following reasons. It is best that the track does not occur, but if it occurs, it is efficient to return only to the element searched just before the track occurrence in an early stage of the search. Also, the probability that unevenly distributed nodes are present near an arbitrary node in a scarce node group is higher than the probability that the scarce node is present near an arbitrary node in an unevenly distributed node group. From that, when the search is sequentially carried out from the scarce node, the rack can be less. As a result, search time can be shortened when searching the resource (the node and the edge) satisfying the resource requirements from the management object resource (infrastructure) for the service deployment request by the user.

Next, a modification of the present embodiment will be described. In the embodiment described above, when preparing the node-based linear list, the node with the highest scarcity is defined as the leading node, and the following nodes are sequentially selected arbitrarily on requirement that the edges can be followed from the leading node. In contrast, in the modification, when preparing the node-based linear list, the node with the highest scarcity is defined as the leading node, and the nodes with the higher scarcity are sequentially selected on requirement that the edges can be followed from the leading node for the following nodes.

FIG. 15 illustrates one example of the scarcity table holding the scarcity of each node in the present embodiment (modification). A scarcity table 50a in FIG. 15 is a table for which an item of "scarcity order" is added to the scarcity table 50 in FIG. 10. The "scarcity order" is an order for which a number is assigned in an ascending order of the adaptation probability (a descending order of the scarcity).

Figure 16A:
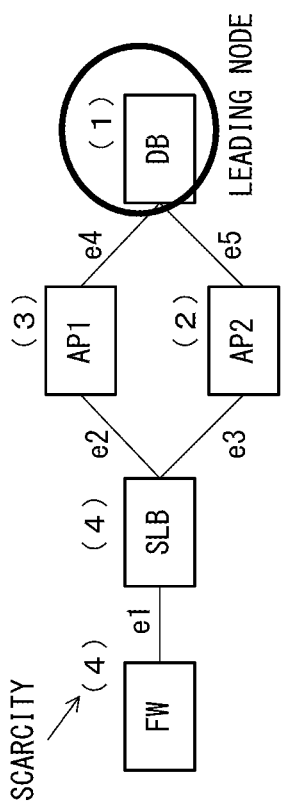
FIGS. 16A-16C are diagrams for describing the preparation procedure of the search sequence list in the present embodiment (modification).
Figure 16C:
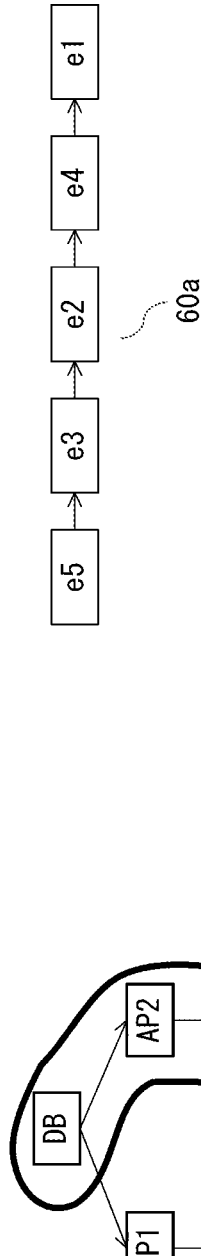
Figure 16B:
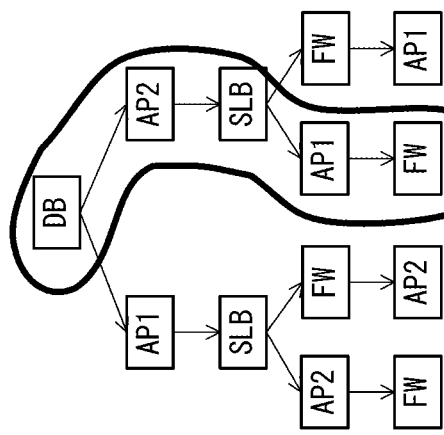

FIGS. 16A-16C are diagrams for describing the preparation procedure of the search sequence list in the present embodiment (modification). As illustrated in FIG. 16A, the scarcity order of the scarcity table 50a is applied to the nodes within the service connection topology information in FIG. 6. The node DB with the higher scarcity order becomes the leading node of the linear list.

Here, all the combinations of the linear lists when the node DB is a base point are expressed by a tree as in FIG. 16B. From the root node to the end node of the tree, the nodes with the high scarcity is preferentially selected. Of the nodes AP1 and AP2 connected to the node DB, the node with the high scarcity is AP2, so that AP2 is selected. Since the node connected to AP2 is SLB, SLB is selected. Of the nodes AP1 and FW connected to the node SLB, the node with the high scarcity is AP1, so that AP1 is selected. In FIG. 16A, since there is no unselected node after the node AP1, the unselected node FW is selected from the nodes connected to the node SLB by going back to the node SLB one before. Thus, the sequence of DB→AP2→SLB→AP1→FW is selected.

In this way, in the case where the plurality of unselected nodes are connected to the node selected last when sequentially selecting the unselected nodes following the edges from the leading node, the node with the highest scarcity among the unselected nodes is selected. When there are the plurality of nodes with the highest scarcity among the unselected nodes, one of the nodes may be selected, or one of the nodes may be selected according to the highness of the scarcity of the next nodes following the nodes.

Since the graph matching algorithm used in the present embodiment uses the edge-based linear list, the node-based linear list generated above is changed to edge-based one. Then, the linear list (search sequence list 60a) illustrated in FIG. 16C: e5→e3→e2→e4→e1 is obtained.

Figure 17:
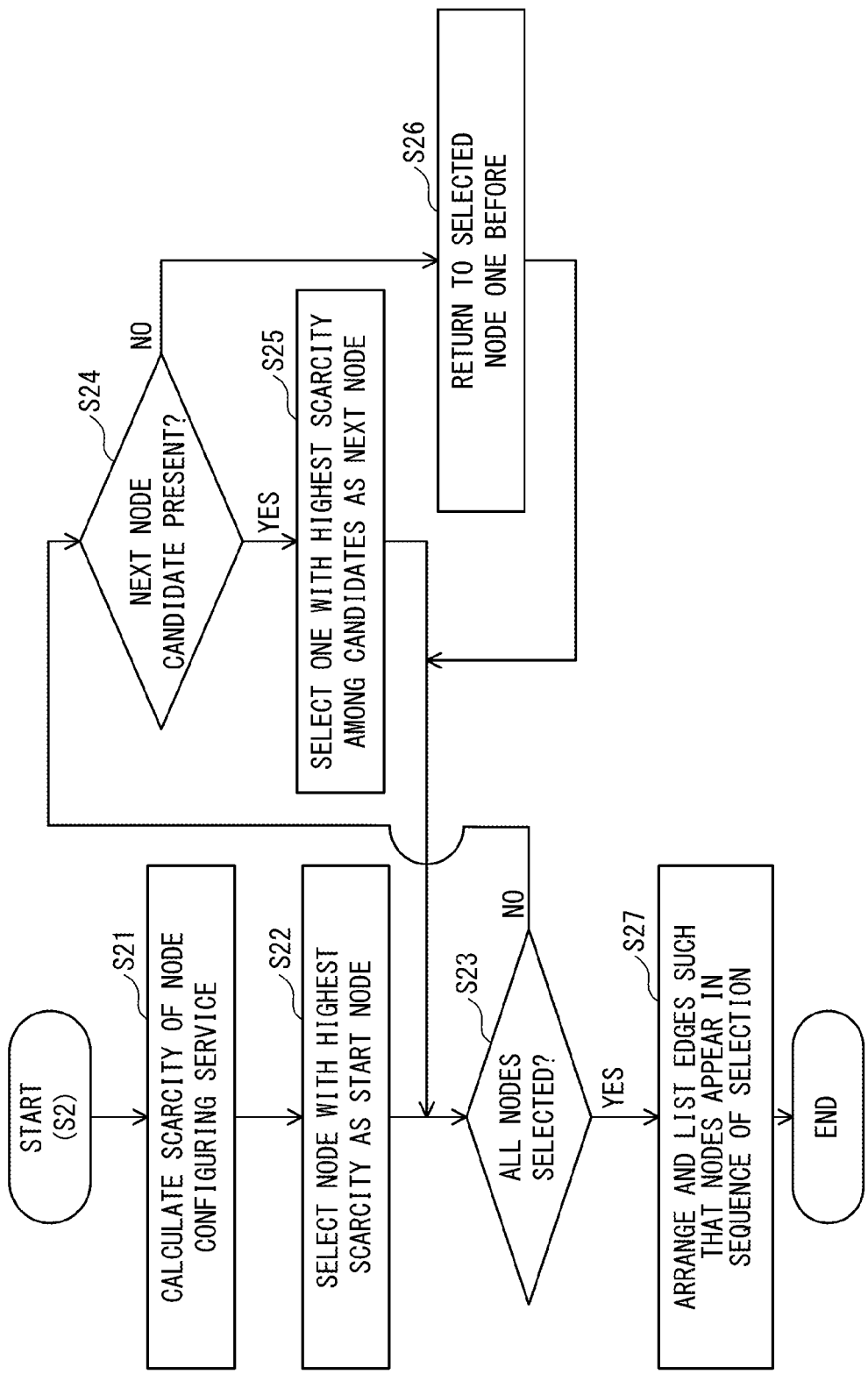
FIG. 17 illustrates one example of the detailed flow of the search sequence setting processing (S2) in the present embodiment (modification).

FIG. 17 illustrates one example of the detailed flow of the search sequence setting processing (S2) in the present embodiment (modification). For the flow in FIG. 17, the processing of S25 in the flow in FIG. 13 is replaced with the processing of S25a.

In S25a, the sequence setting unit 22 selects one with the highest scarcity among the next candidates (the nodes that are connected with the node selected last by the edge and are not selected) as the next node, and stores the selected node in the memory. Thereafter, the processing returns to S23. Since the processing other than S25a is similar to FIG. 13, the descriptions are omitted.

According to the present embodiment (modification), when searching the service connection topology information from the infrastructure connection topology information, by carrying out the search from the highest scarcity of the service connection topology information in the search sequence set on the basis of the scarcity, the possibility of the track can be lowered more. Thus, the possibility of the track can be lowered more than in the above-described embodiment. As a result, the search time can be shortened when searching the resource (the node and the edge) satisfying the resource requests from the management object resource (infrastructure) for the service deployment request by the user.

Figure 18:
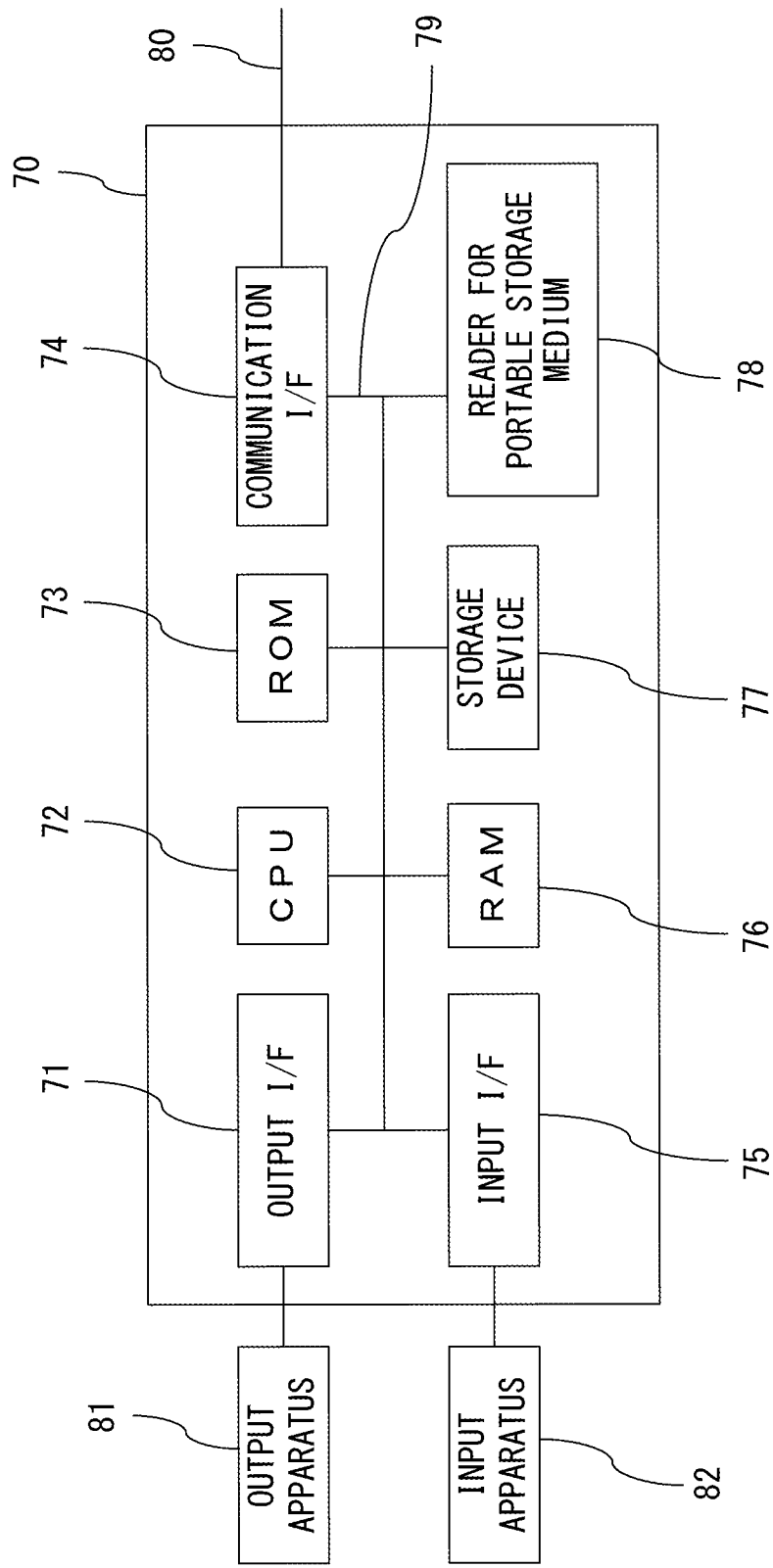
FIG. 18 illustrates one example of a configuration block diagram of a hardware environment of a computer to which the present embodiment is applied.

FIG. 18 illustrates one example of a configuration block diagram of a hardware environment of a computer to which the present embodiment is applied. A computer 70 functions as the resource management device 11 by reading a program for carrying out the processing of the present embodiment.

The computer 70 includes an output I/F 71, a CPU 72, a ROM 73, a communication I/F 74, an input I/F 75, a RAM 76, a storage device 77, a reader 78, and a bus 79. The computer 70 is connectable with an output apparatus 81 and an input apparatus 82.

Here, the CPU indicates a central processing unit. The ROM indicates a read-only memory. The RAM indicates a random access memory. The I/F indicates an interface. To the bus 79, the output I/F 71, the CPU 72, the ROM 73, the communication I/F 74, the input I/F 75, the RAM 76, the storage device 77, and the reader 78 are connected. The reader 78 is a device for reading a portable recording medium. The output apparatus 81 is connected to the output I/F 71. The input apparatus 82 is connected to the input I/F 75.

As the storage device 77, the storage devices of various forms such as a hard disk drive, a flash memory device and a magnetic disk device are usable.

In the storage device 77 or the ROM 73, for instance, the program for achieving the processing described in the present embodiment is stored. In the RAM 76, the linear list for the nodes and the linear list (search sequence list) for the edges are stored.

The CPU 72 reads the program for achieving the processing described in the present embodiment which is stored in the storage device 77 or the like, and executes the program. Specifically, by executing the program, the CPU 72 functions as the request acquisition unit 21, the sequence setting unit 22, the scarcity calculation unit 23, the resource management unit 24, the allocation determination unit 25, and the deployment instruction unit 26.

The program for achieving the processing described in the present embodiment may be stored in the storage device 77, for instance, from a program provider side through a communication network 80 and the communication I/F 74. Also, the program for achieving the processing described in the present embodiment may be stored in a portable storage medium that is put on the market and distributed. In this case, the portable storage medium may be set to the reader 78, and the program may be read and executed by the CPU 72. As the portable storage medium, the storage media of various forms such as a CD-ROM, a flexible disk, an optical disk, a magneto-optical disk, an IC (integrated circuit) card, and a USB (Universal Serial Bus) memory device are usable. The program stored in such a storage medium is read by the reader 78.

Also, for the input apparatus 82, a keyboard, a mouse, an electronic camera, a web camera, a microphone, a scanner, a sensor, a tablet and a touch panel, etc., are usable. For the output apparatus 81, a display, a printer and a speaker, etc., are usable. The network 80 may be a communication network of the Internet, a LAN, a WAN, an exclusive line, a cable and radio, etc.

According to one aspect of the present embodiment, a service having a resource satisfying a requirement requested by a user can be efficiently searched from an information processing system.

The present embodiment is not limited to the above-described embodiment, and various configurations or embodiments can be taken without departing from the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A resource searching device comprising:
    a storage which stores system configuration information including information on a plurality of resources related to devices and connections between the devices in an information processing system to be managed; and
    a processor which performs a process including:
        acquiring resource requirement information including resource requirements for a plurality of resources, the resource requirements being related to a deployment request of a plurality of received resources and being related to devices or connections between the devices;

referring to the system configuration information stored in the storage and calculating fulfillment rate information including a fulfillment rate for each of the plurality of resources that satisfy the resource requirements; and searching for a plurality of searched resources corresponding to the deployment request of the plurality of resources by sequentially selecting the searched resources that satisfy the resource requirements on the basis of the fulfillment rate information and the connections between the devices in the deployment request.

2. The resource searching device according to claim 1, wherein the processor selects, in the searching, a resource with a lowest fulfillment rate first.

3. The resource searching device according to claim 2, wherein the processor selects, in the searching, the resource with the lowest fulfillment rate of the unselected resources when a plurality of unselected resources are connected to the resource selected last.

4. The resource searching device according to claim 2, wherein the processor sequentially selects, in the searching, the searched resources that satisfy the resource requirements by tracking from the resource selected first based on the connections between the devices.

5. The resource searching device according to claim 1, wherein the processor calculates, in the calculating, the fulfillment rate of the devices that satisfy the resource requirements with respect to the device obtained from the system configuration information, and the processor searches, in the searching, for the plurality of searched resources corresponding to the deployment request of the plurality of resources by selecting a device with a lowest fulfillment rate first and by sequentially selecting unselected devices by tracking the connections from the device selected first.

6. The resource searching device according to claim 5, wherein the processor selects, in the searching, the device with the lowest fulfillment rate among the unselected devices when a plurality of unselected devices are connected to the device selected last.

7. A non-transitory computer-readable recording medium having stored therein a resource searching program for causing a computer to execute a digital signature process comprising:

acquiring resource requirement information including resource requirements for a plurality of resources, the resource requirements being related to a deployment request of a plurality of received resources and being related to devices or connections between the devices;

referring to system configuration information including information on the plurality of resources related to devices and connections between the devices in an information processing system to be managed, and calculating fulfillment rate information including a fulfillment rate for each of the plurality of resources that satisfy the resource requirements; and searching for a plurality of searched resources corresponding to the deployment request of the plurality of resources by sequentially selecting the searched resources that satisfy the resource requirements on the basis of the fulfillment rate information and the connections between the devices in the deployment request.

8. The non-transitory computer-readable recording medium according to claim 7, wherein the sequentially selecting selects a resource with a lowest fulfillment rate first.

9. The non-transitory computer-readable recording medium according to claim 8, wherein the sequentially selecting selects the resource with the lowest fulfillment rate among the unselected resources when the plurality of unselected resources are connected to the resource selected last.

10. The non-transitory computer-readable recording medium according to claim 7, wherein the sequentially selecting sequentially selects the searched resources that satisfy the resource requirements by tracking from the resource selected first based on the connections between the devices.

11. The non-transitory computer-readable recording medium according to claim 7, wherein the calculating calculates the fulfillment rate of the device that satisfy the resource requirements with respect to the device obtained from the system configuration information;

the searching searches for the plurality of searched resources corresponding to the deployment request of the plurality of resources by selecting a device with a lowest fulfillment rate first and sequentially selects the unselected devices by tracking the connections from the device selected first.

12. The non-transitory computer-readable recording medium according to claim 11, wherein the sequentially selecting selects the device with the lowest fulfillment rate among the unselected devices when the plurality of unselected devices are connected to the device selected last.

* * * * *